Aug. 24, 1926.  
F. L. VORDEMFELDE  
1,597,640  
TIRE CHAIN CARRIER  
Filed March 28, 1925  
4 Sheets-Sheet 1
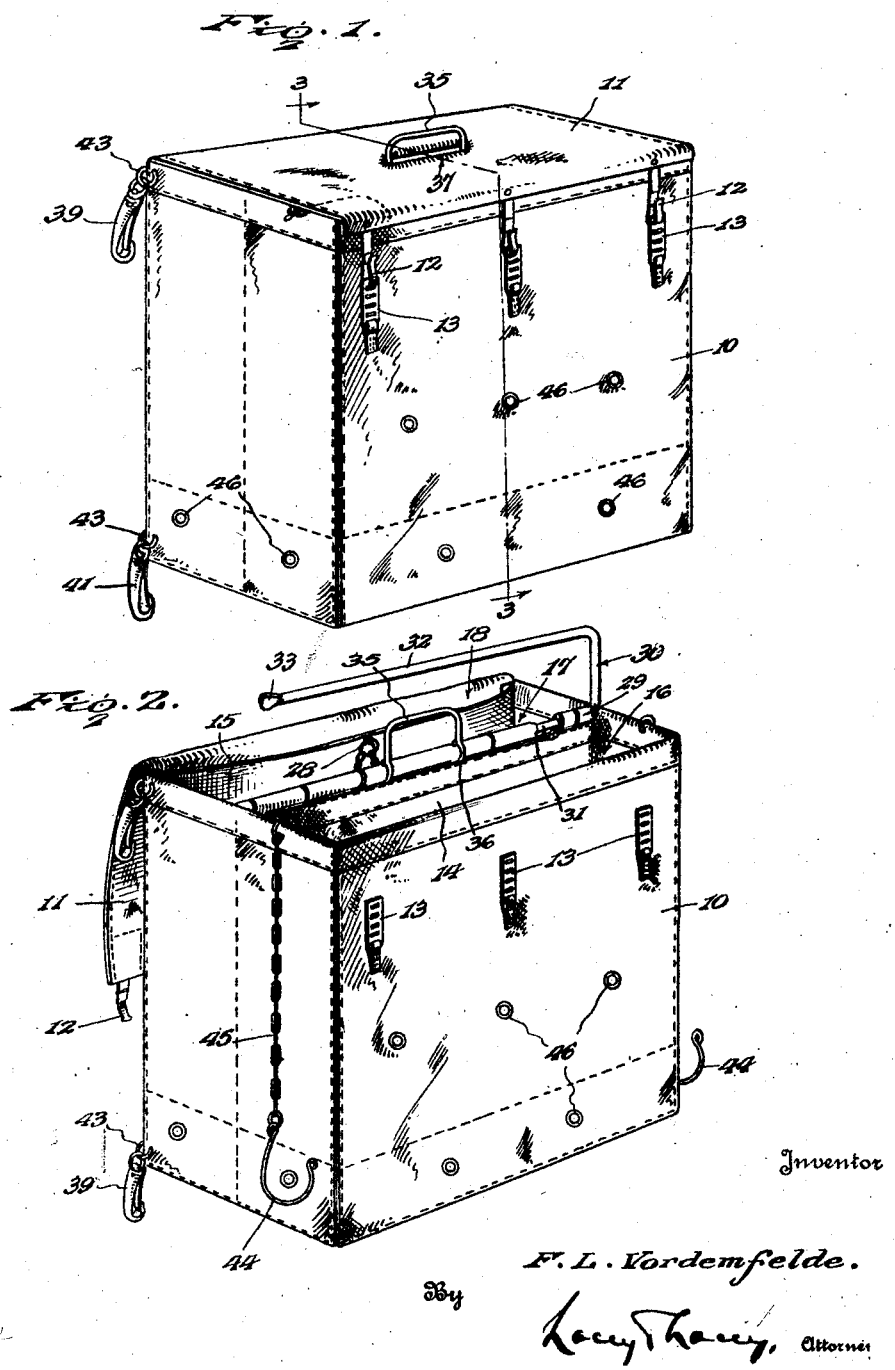

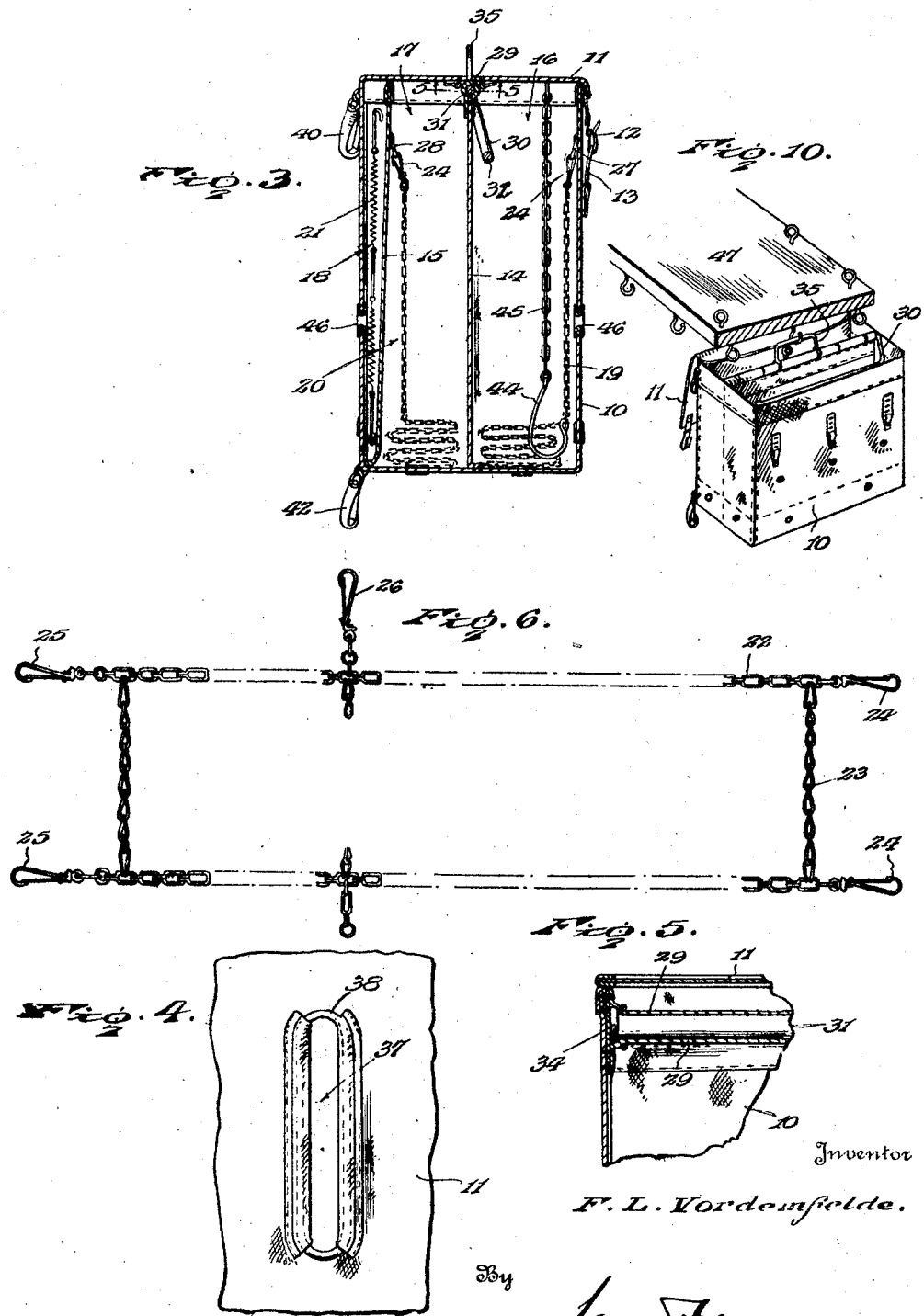

Aug. 24, 1926.
F. L. VORDEMFELDE
1,597,640
TIRE CHAIN CARRIER
Filed March 28, 1925     4 Sheets-Sheet 3
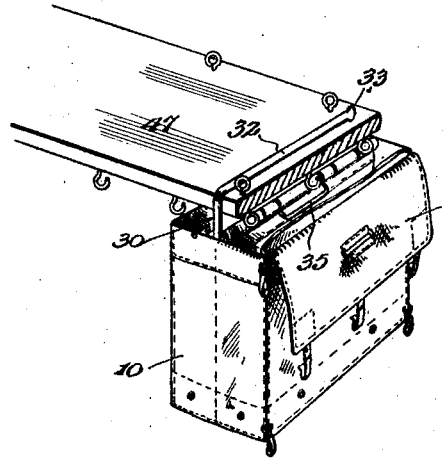
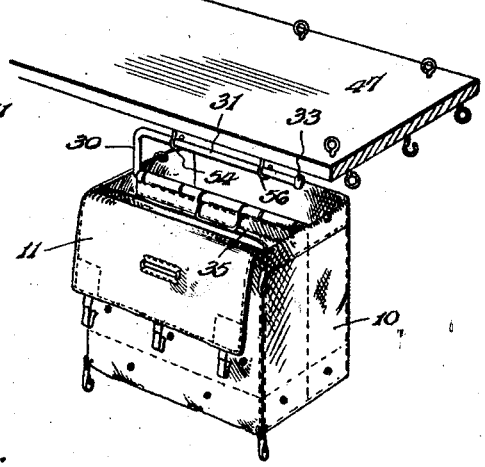
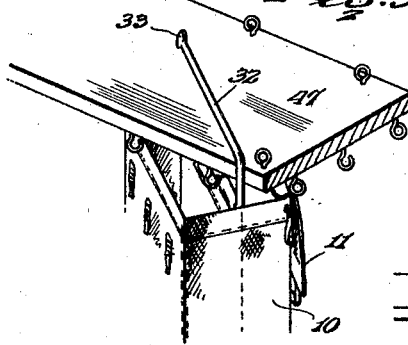
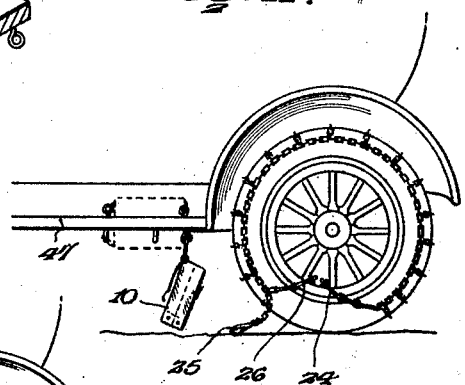
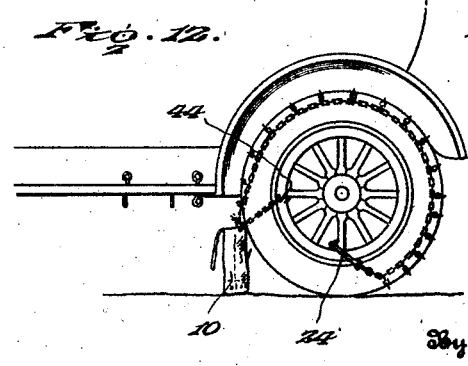
Inventor
F. L. Vordemfelde.
By Lacy & Lacy, Attorneys

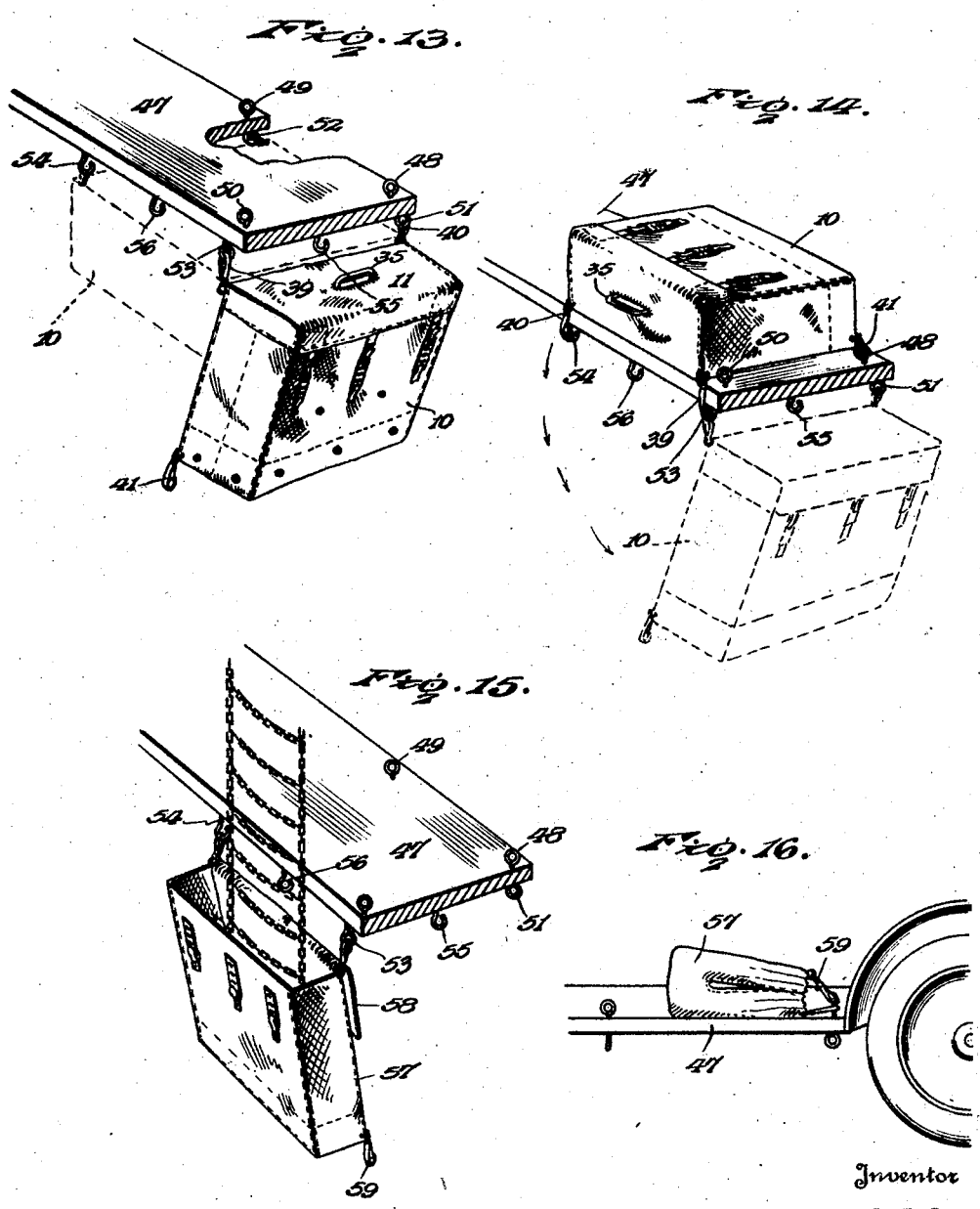

Patented Aug. 24, 1926.

1,597,640

UNITED STATES PATENT OFFICE.

FRED L. VORDEMFELDE, OF BUTLER, PENNSYLVANIA.

TIRE-CHAIN CARRIER.

Application filed March 28, 1925. Serial No. 19,028.

This invention relates to an improved tire chain carrier for motor vehicles and seeks, among other objects to provide a neat, practicable and convenient device for carrying the tire chains of a vehicle on one of the vehicle running boards.

The invention further seeks to provide a device so constructed and mounted that the chains may be conveniently withdrawn therefrom directly about the rear wheels of the vehicle, thereby greatly facilitating the operation of applying the chains.

A still further object of the invention is to provide a device embodying a separate pocket for each chain so that the chains will not become entangled, and wherein means will be provided in each pocket for anchoring the uppermost or free end of the chain so that the free end of the chain cannot become entangled with the remaining portion thereof while said end of the chain will always be held in such position that it may be readily grasped for withdrawing the chain from the device.

Another object of the invention is to provide a device embodying a hanger by means of which the device may, when depositing the chains in the device or removing the chains therefrom, be suspended from one of the running boards in the desired position found most convenient.

Still another object, in this connection, is to provide means whereby the device may, if desired, be attached directly to the wheel so that a chain may be pulled from the device directly about the wheel tire.

And the invention seeks, as a still further object, to provide a device of durable construction, which will be inexpensive, and which will be adapted for general use.

Other and incidental objects will appear hereinafter.

In the accompanying drawings:—

Figure 1 is a perspective view of the chain pouch employed.

Figure 2 is a perspective view showing the pouch open.

Figure 3 is a vertical sectional view through the pouch.

Figure 4 is a detail bottom plan view showing the eyelet in the closure flap of the pouch to receive the handle employed.

Figure 5 is a fragmentary detail sectional view on the line 5—5 of Figure 3, looking in the direction indicated by the arrows.

Figure 6 is a plan view showing the chain employed.

Figure 7 is a perspective view showing the pouch swung from one of the running boards of a vehicle in such position that one of the chains may be withdrawn from the pouch about the adjacent rear wheel of the vehicle.

Figure 8 is a perspective view showing the manner in which the pouch may be swung from the running board so that the chains may be deposited in the pouch.

Figure 9 is a perspective view showing another way in which the pouch may be swung from the running board.

Figure 10 is a perspective view showing still another way in which the pouch may be swung from the running board so that the chains may be withdrawn therefrom.

Figure 11 is a fragmentary elevation particularly showing the manner in which the chains may be engaged about the wheel tires.

Figure 12 is a fragmentary side elevation showing the pouch connected directly to one of the rear wheels of the vehicle in such position that one of the chains may be withdrawn from the pouch about the wheel tire.

Figure 13 is a perspective view showing, in full lines, the pouch lowered so that the chains may be withdrawn therefrom and illustrating in dotted lines the manner in which the pouch may be carried beneath the running board.

Figure 14 is a perspective view showing in full lines another way in which the pouch may be carried upon the running board and illustrating in dotted lines the manner in which the pouch may be swung down so that the chains may be removed therefrom.

Figure 15 is a perspective view showing a slightly modified form of pouch.

Figure 16 is a fragmentary elevation showing one way in which the modified form of pouch may be carried upon the running board.

In carrying the invention into effect, I employ a substantially rectangular pouch 10 of appropriate dimensions. This pouch may be of canvas or other approved material and normally closing the pouch is a closure flap 11 integral with the back wall of the pouch and equipped with buckles 12 for engagement with buckle plates 13 on the front wall of the pouch for securing the flap closed. Extending transversely within the pouch is a center partition 14 as well as a back partition 15 and, as best shown in Figure 3, these partitions divide the pouch into pockets 16, 17 and 18 respectively, the pockets 16 and 17 being considerably larger than the pocket 18. The pocket 16 is designed to receive one of a pair of chains as indicated at 19 and the pocket 17 is designed to receive the other chain of the pair, as indicated at 20, while the pocket 18 is designed to receive a pair of conventional chain tensioning devices as indicated at 21. The chains 19 and 20 are each of the character shown in Figure 6, and include parallel side members 22 connected by short cross chains 23. At corresponding ends of the side members is a pair of snap hooks 24 while at opposite corresponding ends of said members is a like pair of snap hooks 25, and connected by short lengths of chain to the side members 22 near the latter ends thereof is a pair of snap hooks 26. In depositing a chain in either of the pockets 16 and 17, one end of the chain is grasped and the other end lowered into the pocket, and secured to the front wall of the pouch near the mouth thereof is a ring 27 with which the snap hooks at one end of the chain 19, as for instance, the snap hooks 24, are engaged, while secured to the partition 15 is a like ring 28 with which the snap hooks at one end of the chain 20 are engaged. Thus, the free end of each chain will always be held uppermost within the pouch so that by disengaging the snap hooks from the rings 27 and 28, the chains may be readily removed.

Secured by a binding strip 29 to the top margin of the partition 14 is a substantially U-shaped hanger 30, one arm 31 of which is enclosed by said binding strip while the other arm 32 of said hanger extends in parallel relation to the arm 31 and is provided at its free end with a flattened terminal 33. Formed on the free end of the arm 31 is, as shown in detail in Figure 5, a circular head 34 enclosed by the binding strip 29 so that said arm cannot slip endwise from within the binding strip and, as shown in Figure 3, the hanger may be swung downwardly to lie within the pocket 16 of the pouch so that the flap 11 may be closed. Engaged with the arm 31 of the hanger is a handle 35, the ends of which are provided with loops 36 which extend through the binding strip 29, freely embracing said arm, and formed in the closure flap 11 medially thereof is an opening 37 to accommodate the handle so that when said flap is closed, the handle will, as shown in Figure 1, project through said opening so as to be readily grasped, surrounding the opening is, as shown in Figure 4, a projecting eyelet 38 for preventing the tearing of the closure flap at said opening. Thus, the pouch may be readily carried.

Swingingly mounted at the upper rear corners of the pouch is a pair of snap hooks 39 and 40 and similarly mounted at the lower corners of the pouch is a pair of like snap hooks 41 and 42. All of these snap hooks may be connected with the pouch by rings 43. The pouch is further equipped at the ends thereof with a pair of hooks 44 connected with the top hem of the pouch near the forward side thereof by short lengths of chain 45 and, as shown in Figure 3, the hooks 44 and chains 45 may be disposed in the pocket 16 of the pouch when the pouch is closed. Fixed to the front and back walls of the pouch as well as the end walls thereof is a plurality of suitably located eyelets 46 which provide drain openings for the pouch.

In use, the pouch is carried upon one of the running boards of the vehicle and in the drawings I have conventionally shown a running board at 47. Sunk into the rear end portion of the running board at its upper side are screw eyes 48 and 49 located adjacent the inner edge of the board while a like screw eye 50 is disposed opposite the eye 48 near the outer edge of the board. Depending from the lower side of the board near its inner edge are screw eyes 51 and 52 and arranged opposite said eyes near the outer edge of the board is a depending screw eye 53 and screw hook 54. Between the screw eyes 51 and 53 is a depending screw hook 55 and between the screw eye 53 and screw hook 54 is a depending screw hook 56. As shown in dotted lines in Figure 13, the pouch may be carried beneath the running board by engaging the hooks 39 and 40 with the eyes 51 and 53 and engaging the hooks 41 and 42 with the eye 52 and hook 54, when the pouch will be swung beneath the running board by said hooks. Accordingly, when it is desired to apply the chains, the hooks 41 and 42 may be disengaged from the eye 52 and hook 54 when the pouch will swing down to the position shown in full lines in this figure of the drawings, so that the cover flap 11 may be drawn back and the chains withdrawn from the pouch.

In Figure 14, I have shown one way in which the pouch may be carried on top of the running board. As illustrated, the hooks 39 and 40 are engaged with the eye 53 and hook 54 while the hook 41 is engaged with the eye 48. Thus, by releasing the hooks 40 and 41, the pouch may be readily swung down to the dotted line position shown and the hook 40 engaged with the eye 51, when the pouch will be suspended beneath the running board, ready for the removal of the chains therefrom. If preferred, the hook 39 may be engaged with the eye 50 and the hooks 41 and 42 engaged with the eyes 48 and 49 for securing the pouch on top of the running board, the hook 40 being engaged with the hook 54.

Figure 11 of the drawings shows the pouch suspended from the running board as in Figure 13, and illustrates the manner in which the chains may be applied about the tires of the rear wheels of the vehicle. The chain is pulled from the carrier and the free end thereof directed upwardly over the wheel tire to a point near the ground at the rear of the wheel, when the hooks 24 and 26 are passed between adjacent spokes of the wheel and engaged. The vehicle is then backed until the chain is brought to a position extending completely about the wheel tire. The hooks 24 are then disengaged from each other and engaged with the pair of hooks 25 for securing the chain about the tire. Figure 11 also shows, in dotted lines, the manner in which the pouch may be carried on top of the running board, as previously described, or may be carried beneath the running board, as also previously described.

Figure 12 shows another way in which the pouch may be arranged when applying the chains to the rear wheels of the vehicle. As shown, the hooks 24 of the pouch are engaged with adjacent spokes of the wheel for securing the pouch in position at the front of the wheel resting on the ground, when the chain is manually pulled from the pouch about the wheel tire. The free end of the chain is secured by engaging the hooks 24 with each other between a pair of the wheel spokes and the pouch detached from the wheel, when the operation of applying the chain may be continued as described in connection with Figure 11.

In Figure 7 of the drawings, I have shown another way in which the pouch may be suspended from the rear end of the running board when removing the chains from the pouch. As illustrated, the hanger 30 is swung upwardly from within the pocket 16 of the pouch and the arm 32 of said hanger engaged over the rear end of the running board so that the hanger will thus serve to suspend the pouch beneath the running board. The flattened terminal 33 is provided at the free end of the arm 32 to bear into the running board at its upper side to prevent the hanger from slipping on the running board and, as will be seen, the hanger thus provides a very convenient means whereby the pouch may be suspended from the running board in the desired position for removing the chains from the pouch. Figure 8 shows the arm 32 of the hanger engaged with the eye 44 and hook 56 at the outer edge of the running board for supporting the pouch in convenient position for depositing the chains therein. Figure 9 shows the arm 32 of the hanger engaged over the outer margin of the running board for supporting the pouch to receive the chains and it is evident that while I have illustrated several different ways in which the hanger may be employed for suspending the pouch, still, as will be appreciated, the hanger may be engaged with the eyes and hooks upon the running board in various positions other than the positions shown, for suspending the pouch so that access may be conveniently had thereto for depositing the chains in the pouch or removing the chains therefrom. In Figure 10, I have shown the handle 35 engaged with the hook 55 for suspending the pouch at the rear end of the running board so that the chains may be conveniently withdrawn from the pouch and applied.

In Figures 15 and 16 of the drawings, I have illustrated a slight modification of the invention wherein I employ a rectangular pouch 57 carrying a closure flap 58. The pouch 57 is identical with the pouch 10 with the exception that the pouch 57 is not provided with partitions nor is the pouch 57 equipped with a hanger or handle as shown and described in connection with the pouch 10. However, the pouch 57 is equipped at its rear corners with snap hooks 59 which may be engaged with the eyes and hooks of the running board, as previously described, so that said pouch may be carried in the same manner as the pouch 10, as illustrated in Figures 13 and 14 of the drawings, or the pouch 57 may be carried as shown in Figure 16, when the hooks at the corners thereof are engaged with the eyes 48 and 50 of the running board. As will be appreciated, this modified structure is somewhat simpler than the preferred form of the invention. Secured within the pouch is a ring 60 to which the snap hooks at the free ends of the chains are secured when deposited in the pouch so that the free ends of said chains will not become entangled, the ring 60 serving the same purpose as the rings 27 and 28 of the prior embodiment of the invention.

Having thus described the invention, what I claim is:—

1. A tire chain carrier including a chain holding pouch, and a hanger carried by the pouch and normally disposed therein but movable to a position for engagement with a vehicle running board for suspending the pouch therefrom.

2. A tire chain carrier including a pouch, and a substantially U-shaped hanger having one arm thereof secured to the pouch and its opposite arm engagable with a vehicle running board for suspending the pouch therefrom.

3. A tire chain carrier including a pouch, a partition therein defining chain holding pockets, and a hanger secured to said partition and engageable with a vehicle running board for suspending the pouch therefrom.

4. A tire chain carrier including a chain holding pouch, a flap normally closing the pouch, and a hanger secured to the pouch and normally concealed therein by said flap, the hanger being movable to a position, when the flap is open, for engagement with a vehicle running board for suspending the pouch therefrom.

In testimony whereof I affix my signature.

FRED L. VORDEMFELDE. [L. S.]